United States Patent Office 3,410,741
Patented Nov. 12, 1968

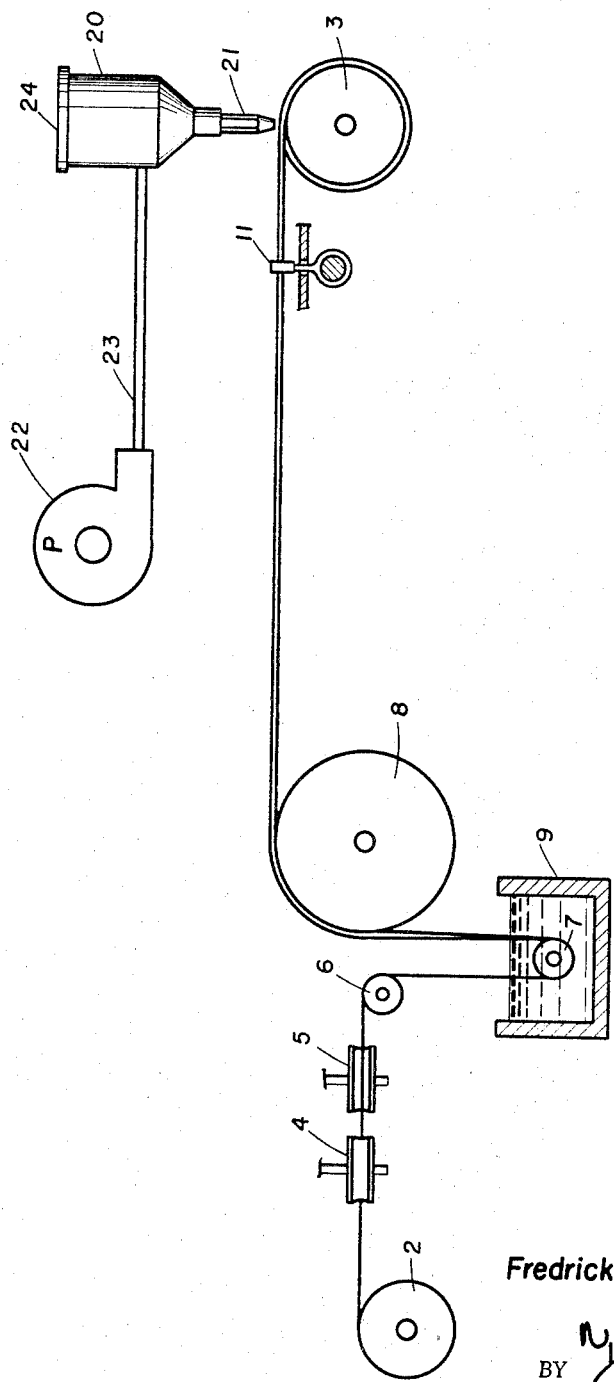

3,410,741
METHOD AND APPARATUS FOR 3-DIMENSIONAL REINFORCEMENT OF PLASTIC LAMINATES
Fredrick R. Barnet, Kensington, Md., assignor to the United States of America as represented by the Secretary of the Navy
Filed Apr. 29, 1964, Ser. No. 363,651
4 Claims. (Cl. 156—173)

ABSTRACT OF THE DISCLOSURE

The method and apparatus for three-dimensional reinforcement of plastic laminated structures under compressive and flexural loadings wherein a continuous glass roving is coated with a plastic resin and is wound in multiple layers on a form. As each layer is wound upon the form, short reinforcing fibers are injected into the resinous coating of the roving in a direction generally perpendicular to the winding direction of the form, and as additional layers are wound over the initially wound roving the previously injected fibers imbed themselves into the resinous coating of the roving being wound such that the reinforcing fibers create an interlaminar reinforcement to prevent shearing between the multiple layers of wound roving. The laminated wound structure of layers of resin coated strands with reinforcing fibers imbedded therein is subsequently cured.

---

The invention described herein may be manufactured and used by or for the Government of the United States of America for governmental purposes without the payment of any royalties thereon or therefor.

This invention relates to the art of reinforced glass fiber plastics and more particularly to a method and apparatus for the reinforcement of plastic laminates in the three orthogonal directions.

Reinforced plastics have been recognized as valuable structural materials for underwater vessels such as mine casings and the like. One of the fundamental requirements of such underwater structures is that they resist static collapsing loads for very long periods of time. It has been found, however, that different types of reinforced plastics behave quite differently in time-to-failure tests under conditions of constant long term hydrostatic loads. For example, glass roving reinforced vessels were found to be stronger under short-time loading than glass fabric reinforced structures. The glass roving vessels resisted pressures as high as 1760 p.s.i., while the average strength for a typical fabric reinforced vessel of the same design was 1000 to 1100 p.s.i. Surprisingly, however, on time-to-failure tests with static loads at pressure levels equal to 60% of ultimate strength the roving reinforced vessels failed in 6 to 17 days while the fabric reinforced vessels withstood these conditions for from 10 to 11½ months.

It is thought that failure in these long-term tests begins with creep and shear in the resin matrix. In the case of the fabric reinforced vessels, the plies of reinforcement are mechanically bound together in one plane by virtue of the fabric weave and resin creep is limited primarily to the layers between the plies. Two-directional reinforcement is gained in the roving reinforced laminates by means of various winding techniques generally well known. The problem remains, however, that the interlaminar zones remain resin rich so that resistance to shear forces there is low. This resin creep permits the vessel to deform to lose its roundness and finally to fail as the shear forces build up in the resin matrix.

Accordingly, it is a general object of the present invention to provide a method for controlling creep and shear characteristics in the resin matrix of a fiber glass laminate structure, while retaining the desirable properties of the laminate structure. A further object of the invention is to provide an apparatus for performing this method.

It is a more particular object of the present invention to provide reinforcement in three orthogonal directions in either a fabric or roving wound reinforced plastic structure in order to improve the mechanical characteristics thereof.

These objects are achieved by the present method and apparatus wherein short reinforcing fibers are introduced into the laminate in a controlled manner so as to tie the laminae together. The laminae can then act together under compressive and flexural loadings and the structure need no longer have its strength characteristics controlled by the visco-elastic nature of the resin matrix. In the preferred embodiment of the invention, the introduction of the reinforcing fibers into the laminate is accomplished by pneumatically projecting the fibers into the laminate at right angles to the surface thereof while the laminate structure is being formed by any known winding process. A reinforcement in a heretofore unreinforced direction is thereby generated continuously layer by layer as the reinforcement is developed in the other two orthogonal directions by winding pattern control as aforementioned. An incidental advantage of the invention is that areas where high resin concentrations would otherwise develop are reinforced by the short fibers so that improved properties are obtained at these points as well.

Other objects and advantages will occur to those skilled in the art upon a consideration of the following detailed description when read in conjunction with the accompanying drawing wherein the single figure is a schematic representation of a fiber glass winding process according to the invention, showing a pneumatic gun for introducing the short fibers into the laminate.

For purposes of illustration, the present invention is shown and described here as being used with the winding apparatus and method of Porter W. Erickson et al., disclosed in application Ser. No. 341,811, filed January 31, 1964, now Patent No. 3,276,522, which is assigned to the United States as is the present application. The same reference numerals will be applied to equivalent parts here for ease of comparison with the Erickson case.

Referring now to the drawing wherein elements are schematically represented, there is shown a supply spool 2 of glass roving or other material to be eventually wound on a mandrel 3. The glass strand, after leaving the supply spool 2, is passed between guide rollers 4 and 5, over another guide roller 6, under dip tank roller 7, over a tension drum 8, through a fleeter arm 11, and finally, onto the mandrel 3. Dip tank roller 7 is disposed in a dip tank 9 which contains any resin suitable for the purpose. In passing through tank 9, the fiber strand receives a coating of the resin. Means not shown are provided for rotating the mandrel 3, moving the fleeter arm 11 in controlled fashion and controlling the tension on the strand. Reference is directed to the Erickson case for the details of these systems.

In accordance with the present invention, means are provided for introducing short fiber reinforcing elements into the glass-resin system in a direction generally perpendicular to the winding direction of the continuous strand or stated differently, in a direction aligned with a diameter of mandrel 3. To this end, there is provided a hopper 20 having a nozzle 21 communicating with the interior thereof. The hopper and nozzle are supported with the free end of the nozzle adjacent the winding mandrel 3 and with the axis of nozzle 21 aligned with a diameter of the mandrel although it is to be understood that the nozzle may also be tilted with respect to the mandrel diameter. A supply of compressed air, generally designated by pump 22, communicates by way of an air line 23 with the interior of hopper 20 from which the air is expelled through nozzle 21. A cap 24 serves to close hopper 20 after the desired amount of reinforcing fibers has been introduced therein. A device known as a "Fiber-Flow Gun" available from the Plaster Supply House, Box 551, Chicago, Illinois, would be a suitable means for this purpose.

In the operation of the present system, a continuous roving reinforcement is coated with resin in dip tank 9 and wound on mandrel 3 in a controlled fashion. As the reinforced body is being built up in this manner, short glass fibers from hopper 20 are introduced into the air stream flowing from nozzle 21. The flow from the nozzle is laminar, at least in the zone between the end of nozzle 21 and the surface of the laminate, so that the short reinforcing fibers are aligned with the flow direction and are injected into the laminate at right angles to the other reinforcement being laid down. It is to be understood that if the body being wound on mandrel 3 has significant axial extent it will be necessary to provide some means for distributing the short reinforcing fibers in the axial direction. This can be accomplished for example by providing a plurality of nozzles distributed along the surface in the axial direction or by mounting a single nozzle over the guide on the fleeter arm 11 and securing the nozzle thereto in such manner that it travels with the fleeter arm and always remains in position to distribute the glass fiber into the plastic material. After it is formed, the structure is cured in any suitable manner.

The short reinforcing fibers need not be glass, but may be of any suitable material known to those skilled in the art. Materials having higher mechanical moduli than glass are available, examples of which are alumina whiskers, available from General Electric Co., or zirconia fibers produced by H. I. Thompson Co. These materials are desirable since they can be shot more easily into the laminate plane and with greater penetration. Moreover, fibers of this kind can be used in longer lengths so that a greater overlapping of laminae can be achieved.

The process as here described produces a reinforced plastic structure having greatly improved properties. The resin richness of the interlaminar zones is eliminated whereby the undesirable characteristics of poor creep resistance and interlaminar shear strengths are countered. The resulting product is a structure with high level, long-term load bearing characteristics in compressive and flexural loading. Fatigue resistance is also improved.

Other modifications and variations of the present invention will occur to those skilled in the art after reading the above description. It is to be understood therefore that within the scope of the appended claims the invention may be practiced otherwise than is specifically disclosed.

What is claimed is:

1. The method of forming a reinforced plastic structure comprising the steps of:

coating a continuous strand with a plastic resin, winding said coated strand in at least one layer on a form in a controlled manner, injecting short reinforcing fibers into the resinous coating of said strand in a direction generally perpendicular to the winding direction of said strand, continuing the winding of said coated strand with reinforcing fibers to form at least one additional layer over the initially wound strand, and curing said resin in the wound structure to form a system of layers of resin coated strands with reinforcing fibers imbedded therein.

2. The method as recited in claim 1 wherein the step of injecting short reinforcing fibers into said resinous coating is carried out by introducing said fibers into a laminar stream of compressed air, and directing said stream at substantially right angles to said laminate layers.

3. Apparatus for producing a reinforced plastic article comprising:

means for supplying a continuous length of strand, means for conducting said strand through a resin bath to thereby apply a coating of resin thereto, controllable means for winding said coated strand into a body with the wound coated strand lying in generally parallel layers, and means for injecting short reinforcing fibers into said coated strand between said parallel layers at substantially right angles to said coated strand as said strand is being wound.

4. Apparatus as in claim 3 wherein said means for injecting reinforcing fibers into said body comprises:

a hopper for containing a supply of said short reinforcing fibers, a nozzle communicating with the interior of said hopper and having the free end thereof disposed adjacent said body, and a source of compressed air communicating with the interior of said hopper, whereby said fibers will be forcibly projected out of said nozzle into said reinforced body.

References Cited

UNITED STATES PATENTS

| | | | |
|---|---|---|---|
| 2,789,075 | 4/1957 | Stahl | 156—279 X |
| 2,792,323 | 5/1957 | Ashcroft et al. | 117—33 X |
| 3,190,137 | 6/1965 | Adams | 117—33 X |
| 3,262,826 | 7/1966 | Balkin et al. | 156—171 |
| 3,276,895 | 10/1966 | Alford | 117—33 X |

PHILIP DIER, *Primary Examiner.*